United States Patent
McKee et al.

(10) Patent No.: US 10,464,677 B2
(45) Date of Patent: *Nov. 5, 2019

(54) AIRCRAFT MODULAR LAVATORY SYSTEM

(71) Applicant: B/E AEROSPACE, INC., Winston Salem, NC (US)

(72) Inventors: Jefferey McKee, Duvall, WA (US); Trevor Skelly, Bellevue, WA (US)

(73) Assignee: B/E Aerospace, Inc., Winston Salem, NC (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/288,823

(22) Filed: Oct. 7, 2016

(65) Prior Publication Data

US 2017/0021929 A1    Jan. 26, 2017

Related U.S. Application Data

(63) Continuation-in-part of application No. 14/677,626, filed on Apr. 2, 2015.
(Continued)

(51) Int. Cl.
*B64D 11/02* (2006.01)
*B64D 11/06* (2006.01)
*B64D 11/00* (2006.01)

(52) U.S. Cl.
CPC .......... *B64D 11/02* (2013.01); *B64D 11/0691* (2014.12); *B64D 2011/0046* (2013.01); *Y02T 50/46* (2013.01)

(58) Field of Classification Search
CPC .................. B64D 11/02; B64D 2011/0046
(Continued)

(56) References Cited

U.S. PATENT DOCUMENTS 3,738,497 A    6/1973 Betts et al.
4,884,767 A * 12/1989 Shibata .................. B64D 11/02
                                                        244/118.5
(Continued)

FOREIGN PATENT DOCUMENTS

WO    WO-2013/124008 A1    8/2013
WO    WO-2014/014780 A2    1/2014
WO    WO 2014/014780 A2    1/2014

OTHER PUBLICATIONS

Apex editor's Blog, "Picture: Airbus markets new streamlined lavatory design for A320 narrowbodies", May 21, 2013. 1 page.
(Continued)

*Primary Examiner* — Brian M O'Hara
*Assistant Examiner* — Keith L Dixon
(74) *Attorney, Agent, or Firm* — Donna P. Suchy

(57) ABSTRACT

In a preferred embodiment, a modular lavatory system for replacing a conventional lavatory monument in an aircraft cabin includes a base lavatory module including a fore sidewall, an aft sidewall, and an aisle wall that form a housing enclosing a toilet unit. A first sidewall of the fore sidewall and the aft sidewall may include a widening region positioned above a passenger seat headrest height. The modular lavatory system may include at least two interchangeable modules configured for mounting against the other sidewall of the base lavatory module. A footprint of the base lavatory module may be smaller than the conventional lavatory monument footprint, such that an extra cabin space is created proximate the other sidewall of the base lavatory module after replacement of the conventional lavatory monument with the modular lavatory system. The at least two interchangeable modules may each be dimensioned for installation within the extra space.

20 Claims, 16 Drawing Sheets

Related U.S. Application Data

(60) Provisional application No. 61/976,342, filed on Apr. 7, 2014.

(58) Field of Classification Search
USPC .................................................. 244/118.5
See application file for complete search history.

(56) References Cited

U.S. PATENT DOCUMENTS

| | | | | |
|---|---|---|---|---|
| 5,150,863 | A * | 9/1992 | Hozumi | B64D 11/00 244/118.5 |
| 6,079,669 | A * | 6/2000 | Hanay | B64D 11/02 244/118.5 |
| 6,182,926 | B1 * | 2/2001 | Moore | B64D 11/00 244/118.5 |
| 6,604,709 | B1 * | 8/2003 | Wentland | B64D 11/00 244/117 R |
| D487,137 | S * | 2/2004 | Itakura | D23/274 |
| 6,848,654 | B1 * | 2/2005 | Mills | B64D 11/00 105/314 |
| 6,889,936 | B1 * | 5/2005 | Pho | B64D 11/02 105/315 |
| D593,647 | S | 6/2009 | Bock | |
| 8,070,098 | B2 * | 12/2011 | Guering | B64C 1/06 244/118.5 |
| 8,109,469 | B2 * | 2/2012 | Breuer | B64D 11/02 244/118.5 |
| 8,590,838 | B2 * | 11/2013 | Cook | B64D 11/02 244/118.6 |
| 8,662,444 | B2 * | 3/2014 | Tappe | B64D 11/02 244/117 R |
| 8,720,827 | B2 * | 5/2014 | Boren | B64D 11/02 160/210 |
| 8,770,517 | B2 * | 7/2014 | Boren | B64D 11/04 105/315 |
| 8,925,862 | B2 * | 1/2015 | Ehlers | B64D 11/02 244/118.5 |
| 9,038,946 | B2 * | 5/2015 | Hawkins | B64D 11/02 244/118.6 |
| 9,862,491 | B2 * | 1/2018 | McKee | B64D 11/02 |
| 2007/0228216 | A1 | 10/2007 | Wenstrom | |
| 2014/0091178 | A1 | 4/2014 | Grieve et al. | |
| 2014/0217239 | A1 | 8/2014 | Ehlers et al. | |
| 2014/0359934 | A1 | 12/2014 | Schliwa et al. | |
| 2015/0129718 | A1 | 5/2015 | Koyama | |
| 2015/0284085 | A1 | 10/2015 | McKee et al. | |

OTHER PUBLICATIONS

Apex editor's Blog; "Japan's Yokohama "extremely disappointed" as Boeing picks B/E for 737 lavatories", Jan. 19, 2012. 2 pages.

Apex editor's blog; "New aircraft lay sees B/E Aerospace flushed with success", Apr. 19, 2013. 1 page.

Eule, Alexander; "Why B/E Aerospace is Flying High", Barron's, Apr. 5, 2014. 1 page.

McCartney, Scott; "Airlines Lays Shrink to Fit More Seats", The Middle Seat Terminal, Mar. 29, 2013. 3 pages.

McDonnell Douglas; DC-10 Customer Configuration Summary, Revised Oct. 1978. 177 pages. Reference pages APPX 1066, 1070, 1072, 1078, 1111, 1191.

Notice of Allowance for U.S. Appl. No. 14/677,626, dated Aug. 28, 2017. 8 pages.

U.S. Court of Appeals for the Federal Circuit; Case Nos. 2016-1496, 2016-1497; Decision dated Oct. 3, 2017. 19 pages.

International Search Report of corresponding International Application No. PCT/US2015/024573; 5 pages; dated Jun. 29, 2015.

Second office action on Chinese Application No. 201580029097.1 dated Dec. 6, 2018. 6 pages.

Office Action on Chinese Patent Application No. 201500290971 dated Apr. 20, 2018. 2 pages.

International Search Report and Written Opinion on International Application No. PCT/US2017/055614 dated Dec. 15, 2017. (9 pages).

* cited by examiner

US 10,464,677 B2

AIRCRAFT MODULAR LAVATORY SYSTEM

CROSS REFERENCES TO RELATED APPLICATIONS

This application is a continuation-in-part of U.S. application Ser. No. 14/677,626, entitled "Modular Lavatory System Optimized for Narrow Body Commercial Aircraft" and filed Apr. 2, 2015, which claims priority from U.S. Provisional Application No. 61/976,342, filed Apr. 7, 2014, the contents of both which are incorporated by reference in their entirety.

BACKGROUND

It is the goal of all of those who design aircraft that space is optimized in every aspect of the aircraft's systems and functions. While all aircraft strive for efficiency and economy in its arrangement of components, this is particularly critical in commercial aircraft. Single aisle aircraft are especially stringent when it comes to the number of seats that can be accommodated, since each additional row of seats, or seats themselves, represents a higher percentage of profitability as compared with larger aircraft. However, the floor plans of these smaller aircraft are typically fixed by other constraints, thereby limiting the number of seats or cabin space available. Any arrangement that allows for additional space in the cabin represents a significant advance in aircraft design.

FIG. 1 illustrates a standard aircraft cabin arrangement for a single aisle aircraft, such as an Airbus A320 family of aircraft. As illustrated in the figure, the width of the lavatories 400 at the rear doors 405 establishes a rearmost position of the last row of reclining passenger seats 410, that position being the forward edge of the lavatories 400 plus another six to eight inches for the seats to move back.

In today's commercial airline industry, operators prefer passenger cabin arrangements that maximize the number of seats available for passengers. Unfortunately, increasing the number of seats in an aircraft can reduce the amount of space available for lavatories and food service galleys 415. Accordingly, there is a need for a high passenger solution ("HPS") for the aft portion of a single-aisle aircraft like that shown in FIG. 1, which provides space for at least one additional row of passenger seats, or in the alternative provides additional galley/storage area. The present disclosure solves this problem and increases the cabin usable area with no loss of performance in any area of the aircraft's existing systems.

SUMMARY OF ILLUSTRATIVE EMBODIMENTS

Aspects of the disclosure provide a modular lavatory system for replacing an existing lavatory system in an aircraft cabin. The modular lavatory system includes a base lavatory module that includes a fore sidewall, an aft sidewall, and an aisle wall that form a housing enclosing a toilet unit. A first sidewall of the fore sidewall and the aft sidewall includes a widening region positioned above a passenger seat headrest height. The modular lavatory system further includes at least two interchangeable modules configured for mounting against the other sidewall of the fore sidewall and the aft sidewall. A footprint of the base lavatory module is smaller than a footprint of the existing lavatory system, such that an extra cabin space is created proximate the other sidewall of the base lavatory module. The at least two interchangeable modules are each dimensioned for installation within the extra space.

Aspects of the disclosure provide a method for retrofitting a conventional lavatory monument location with a modular lavatory system in an aircraft cabin. The method includes removing a conventional lavatory system affixed to the aircraft cabin using at least two overhead anchors from the conventional lavatory monument location, anchoring a base lavatory module of the modular lavatory system using one of the at least two overhead anchors, and anchoring one interchangeable modules of the modular system using another one of the at least two overhead anchors.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where.

DETAILED DESCRIPTION OF ILLUSTRATIVE EMBODIMENTS

Figure 1:
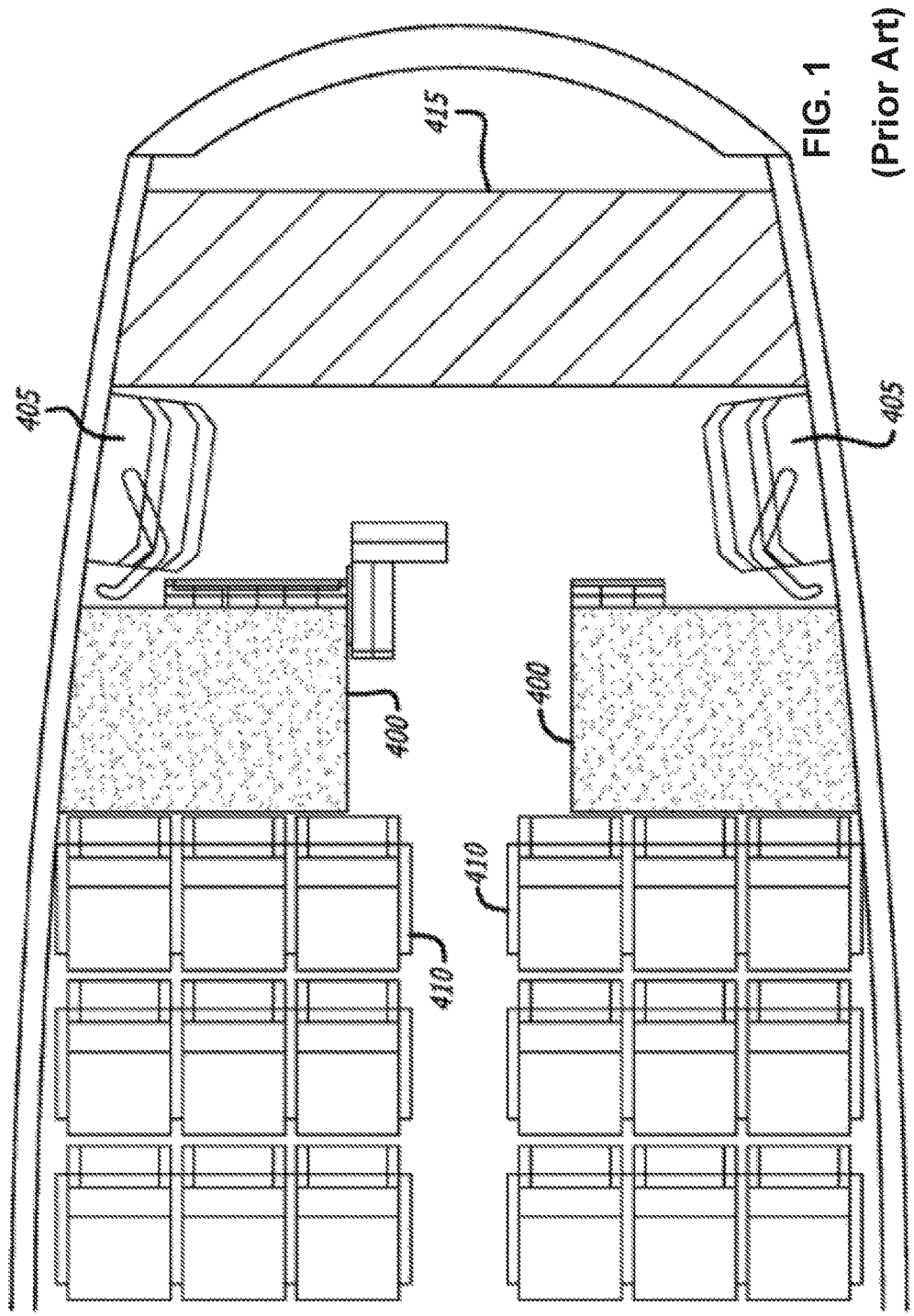
FIG. 1 is a plan view of a prior art single aisle aircraft.

A modular lavatory system includes a base lavatory module designed as a toilet enclosure, and two or more interchangeable modules designed to abut a sidewall of the base lavatory module. The modular lavatory system may be retrofitted into a space previously used by a conventional lavatory monument. Due to a slim design of the base lavatory module, additional floor space previously used by the conventional lavatory monument is available for installing an interchangeable module such as an upper storage region, a "flex wall", or a mounting wall for additional passenger seating.

For ease of reconfiguration, the base lavatory module is anchored separately from the interchangeable lavatory module. For example, the base lavatory module may use a first ceiling anchor previously used by the conventional lavatory monument, while the interchangeable lavatory module may use a second ceiling anchor previously sued by the conventional lavatory monument. Without disturbing the base lavatory module, and by disconnect at as few as a single ceiling anchor, another interchangeable module may be swapped in for a currently used interchangeable module. In this manner, the airline may reconfigure the cabin layout between flights, for example based upon a number of seats sold in each class, a length of trip, or a new promotion. In a particular example, the airline may sell interchangeable module space to a third party, such as a food or beverage vendor, which can supply food or beverages through vending features built into the interchangeable module. In another example, the interchangeable module may be used to modify cubic feet and/or type of storage available within the cabin. Various interchangeable modules, for example, may be configured with coat racks, shelves, bins, and/or racks for storage available for cabin crew and/or passenger use.

In some implementations, at least one interchangeable module may be configured as extended storage area accessible from within the base lavatory module. For example, the base lavatory module may include an opening in a sidewall configured to align with storage space provided by a particular interchangeable module.

In some implementations, the base lavatory module and the interchangeable module may be releasably connected by one or more connection mechanisms. In one example, the connections may be functional, such as clips, latches, or locks configured to secure the base lavatory module and the interchangeable module together. The connections, in one example, may be cosmetic in nature, such as a seal filling a narrow gap which may exist between the base lavatory module and the interchangeable module upon installation. The seal, for example, may be formed from flexible material such as silicon, rubber, etc.

To cosmetically update the surroundings previously covered by the conventional lavatory monument, in some implementations, one or more filler panels may be provided for installation against a cabin wall. For example, where the interchangeable module is an upper module which does not reach all the way to the floor, the cabin wall may be exposed beneath the upper interchangeable module. A filler panel may cosmetically cover the exposed cabin wall, integrating the wall section with the design of the modular lavatory system. The filler panel, in one example, is built into a section of the modular lavatory system, such as the upper interchangeable module or the base lavatory unit sidewall. In another example, the filler panel is a separate piece of the modular lavatory system.

Figure 2:
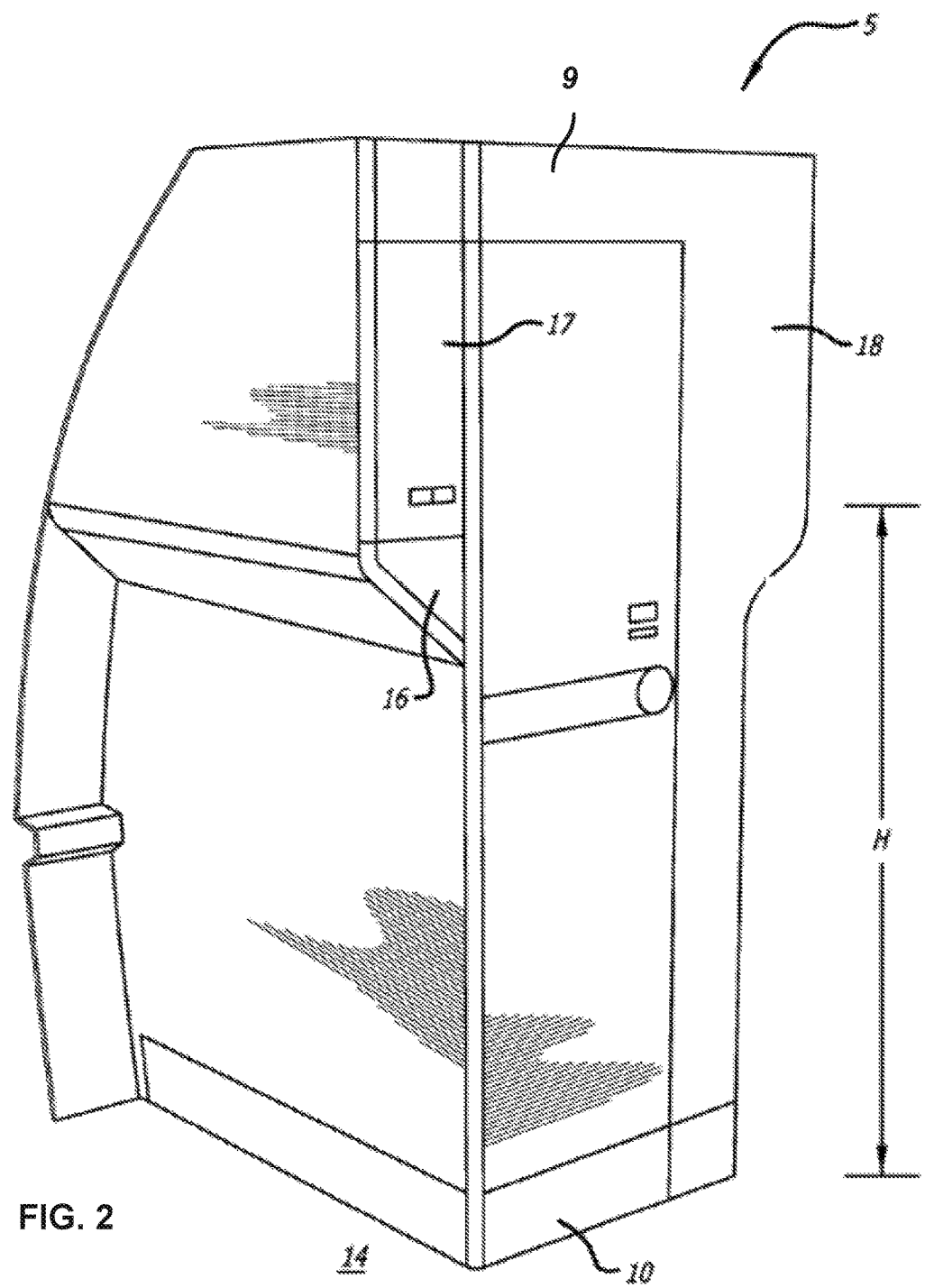
FIG. 2 is an elevated, perspective view of an example layout of a modular lavatory system of the present disclosure.

FIG. 2 illustrates an elevated perspective view of an example of a modular lavatory system 5 of the present disclosure. As can be seen from the figure, the modular lavatory system 5 includes a base lavatory module 9 and an upper stowage module 16. The base lavatory module 9 includes a narrow base 10 and an expanded, broader upper section 18 beginning approximately at the midway point. The profile of the example layout of the modular lavatory system 5 forms a "Y" or slingshot shape due to addition of the upper storage module 16. Through the inclusion of the upper storage module 16, a top portion of the modular lavatory system 5 is significantly wider than the base 10. The height "H" of the widening area 18 of the lavatory system 5 may be selected, for example, to be above a passenger seat headrest height, and to allow an adjacent passenger seat to fully recline against the narrower base portion of the lavatory base module 9, which advantageously allows the seat to be moved closer to the modular lavatory system 5 creating space for possibly an additional row of seats or other revenue generating modules. The space inside the expanded upper portion area 18, in some implementations, can be accessed from inside the base lavatory module 9 and provide the occupant of the base lavatory module 9 with more space at eye level. Additionally, the upper storage module 16, in some implementations, provides additional storage space 17 in the form of a cabinet. The cabinet, for example, may include one or more pull out drawers and/or shelves for various supplies and/or equipment. The cabinet may be lockable. In another example the storage space 17 may be open to the cabin, for example to display available materials such as blankets, magazines, or other articles. In a particular example, the storage space 17 may include a pull-out reading material bin for obtaining newspapers, books, and/or other periodicals.

Figure 3:
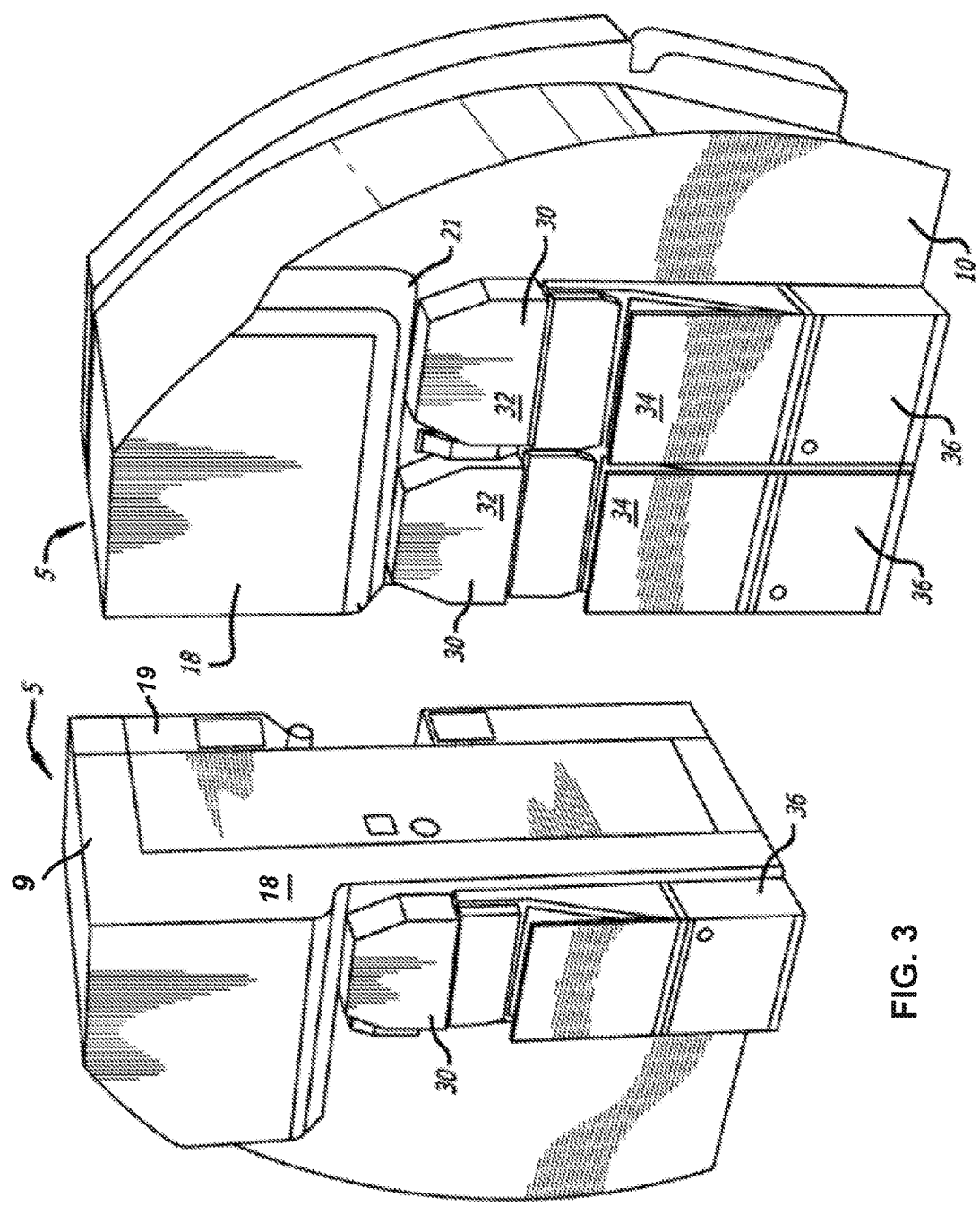
FIG. 3 is an elevated, perspective view of a another example of a modular lavatory system, including flight attendant seating and storage area.

FIG. 3 illustrates an example of how the additional space created by the modular lavatory system 5 can be used to house and deploy a set of flight attendant cabin seats in the free space created by the new design. A pair of modular lavatory systems 5 are situated across from each other in the aircraft as shown in FIG. 3, and each modular lavatory system 5 includes an attendant seat module 30 attached to the corresponding modular lavatory system 5. Each of the attendant seat modules 30 includes one or more fold-down flight attendant seats having a headrest 32 and fold down seats 34, and can be arranged below the widening sections 18 in the void of the contoured lavatory wall 21, virtually eliminating additional footprint of the flight attendant seating when compared with existing lavatory designs. The height "H" of the widening areas 18 of the modular lavatory system 5 can be tailored to accommodate the flight attendant seats exactly so that no wasted space is present, i.e., the flight attendant seats in the folded up position are completely under the expanded portions 18 of the modular lavatory system 5. The flight attendant seat module 30 can also include storage compartments 36 disposed below each attendant seat that can be used to store equipment or supplies. The expanded areas 18 can also be optimally used for storage 17 of lavatory or safety supplies, or otherwise used to house the belongings of the flight attendants. As shown, a flex wall module 19, instead of an upper stowage module 16, is disposed against a sidewall of the base lavatory module 9 opposite to the widening section 18.

Figure 4:
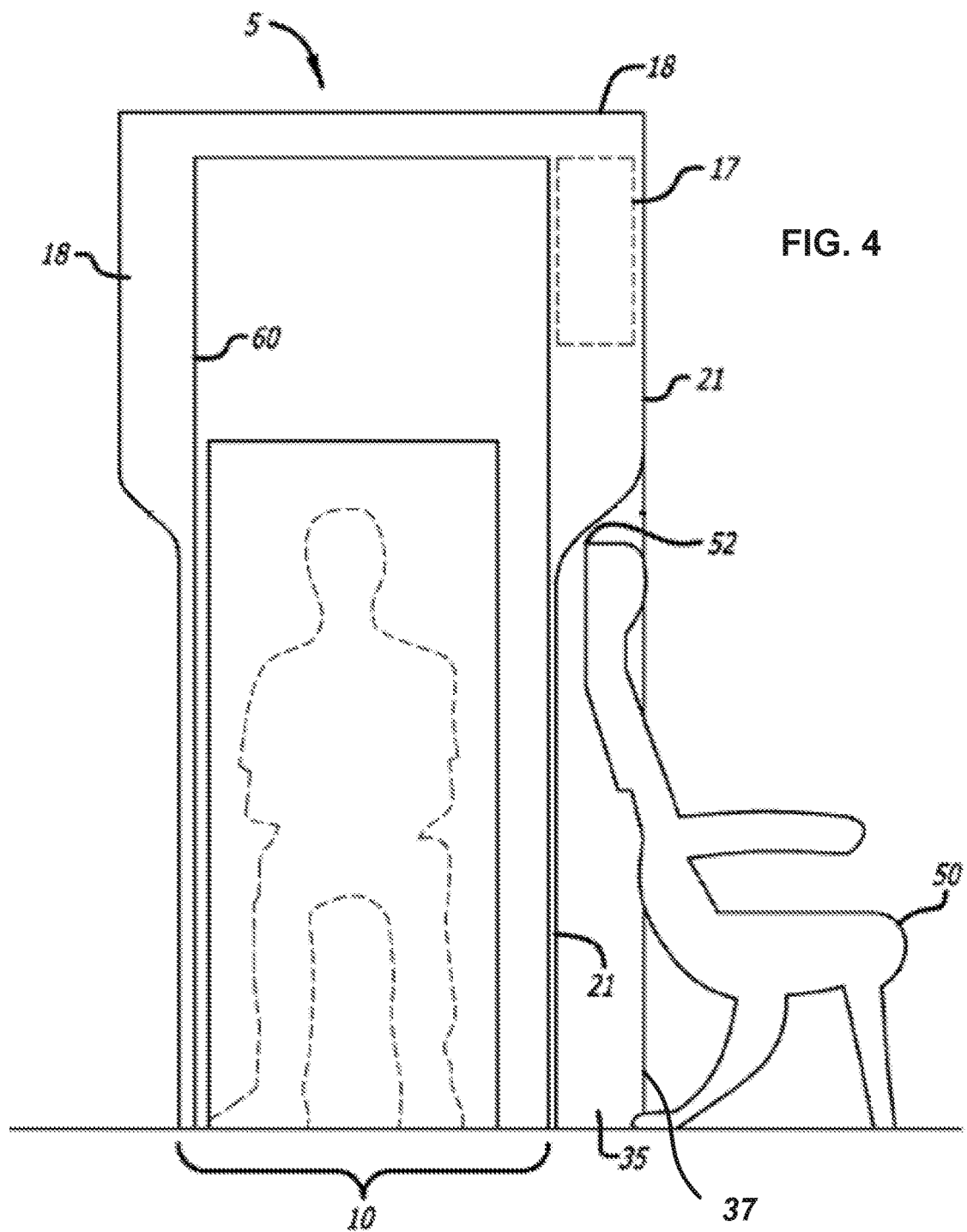
FIG. 4 is a cut away front view of an example modular lavatory system of the present disclosure.

In some embodiments, as illustrated in FIG. 4, the improved lavatory design of the present disclosure can be used to increase the usable floor space of the aircraft by several inches by moving the last row of seats 50 rearward to extend into, at least partially, the void 35 formed in the side of the modular lavatory system 5 by the contoured wall 21. In the new configuration, in one example, up to nine inches or more can be gained on one side of the modular lavatory system 5 by repositioning the seats 50 to account for the void resulting from the narrowed base 10. The contoured forward and aft walls 21 effectively reduce the foot print of the existing lavatories to create a space efficient lavatory, reducing in one example from 36" to 28" the position of the seat's closest point 52 to the door hinge 60 or opening. Furthermore, adding an extended sidewall filler panel 37 may be provided as an element of the modular lavatory system 5, for example to eliminate the need for additional linings and bins otherwise needed to make the modification by covering surface previously blocked by the conventional lavatory monument. The sidewall filler panel 37, in some implementations, is integrated into the fore panel of the base lavatory module (e.g., in the embodiment illustrated in FIG. 4). In other implementations, the sidewall filler panel 37 is provided as a separate component of the modular lavatory system 5.

In FIG. 4, the modular lavatory system 5, in some implementations, includes the storage 17, which can be modularly replaced with revenue generating modes, such as vending machines, dispensers, storage lockers, blankets, and the like. The flexible wall module 21 can also be completely removed in some embodiments to create more cabin space when other modules are not in use. The area of storage 17 can also be used, in some embodiments, for lavatory storage accessible inside the lavatory, such as shelves, driers, vending machines, etc. For example, the base lavatory module 9 may include a removable panel or opening to provide access between the lavatory module 9 and an added module in the position of the flexible wall 21.

Figure 5:
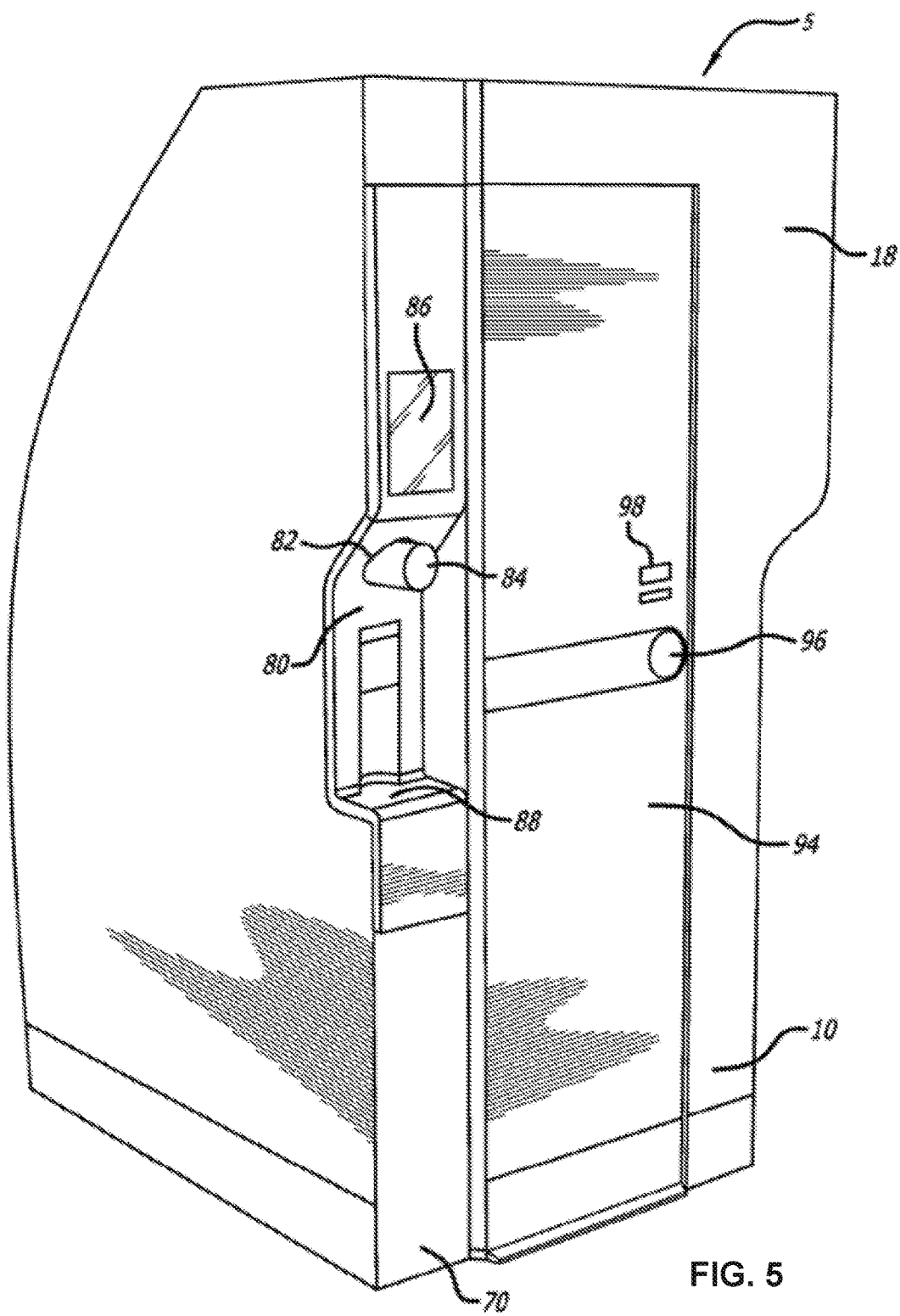
FIG. 5 is an elevated, perspective view of an example modular lavatory system including a flex wall module adjacent to the lavatory.

FIG. 5 illustrates the modular lavatory system 5 with a flex wall module 70 incorporated into the modular lavatory system 5. In this modular lavatory system 5 configuration, an interchangeable forward flex wall module 70 allows flexibility for the airline operator to meet configuration needs. In various embodiments, the space occupied by the flex wall module 70 as shown in FIG. 5 can be used for opportunities to develop ancillary revenue units to fit in this space. For example, the space of the stowage wall module 70 can be used for a vending machine or passenger rental spaces to reserve additional personal belongs storage, or other amenities for which the airlines can offer to customers that also increase the airlines revenue.

FIG. 5 illustrates a drink dispenser 80 that is integrated into the flexible wall module 70. The dispenser 80 may be a courtesy to passengers or a revenue generating dispenser. The dispenser 80 may include a cup holder 82 for holding disposable cups 84, a touch menu screen 86 for selecting beverages from among stored pressurized canisters (not shown) in the flex wall module 70, and a dispensing area 88 for dispensing the beverage. The door 94, its handle/paddle 96, and occupied indicator 98 are unaffected by the presence of the flex wall module 70 and the beverage dispenser 80.

There are many advantages of the modular lavatory system 5, including a turnkey value based product where plug and play quick installation is supported with little to no down time. The new design, for example creates minimal impact to the overall cabin integration by utilizing preexisting lavatory monument anchors for installation. The lavatory walls, in another example, can be sized to have a reduced unit footprint that integrates into existing cabin linings. The design may further provide opportunities for new revenue generation through product placement, rental storage, or adding cabin space for additional premium economy seating. The flexible and modular nature of the design is also an added feature, where the lavatory can be customized with different configurations depending upon the needs of the aircraft and the existing structures (e.g., seat height, etc.). For example, the modular lavatory system 5 may be sold including the base lavatory module 9 and a number of exchangeable modules for adding onto either the left or the right side of the modular lavatory system 5, depending upon the orientation of the expanded region (e.g., region 18) of the base lavatory module 9. The exchangeable modules, in some examples, can include two or more of the upper storage module 16 illustrated in FIG. 2, the flex wall module 17 illustrated in FIG. 5, flex wall module 1320 of FIG. 13; flex wall module 1420 FIG. 14; and/or flex wall module 1520 FIG. 15). Yet another benefit of the modular lavatory system is a weight reduction achieved by the modular lavatory having less material leading to a reduced weight that will help offset a percentage of the increased passenger weight. The modular nature of the system may lead to efficiencies in parts and storage, where interior parts support interchangeable parts. Finally, additional storage may be created in the expanded areas of the lavatories, which can be used to house supplies or equipment.

Figure 6:
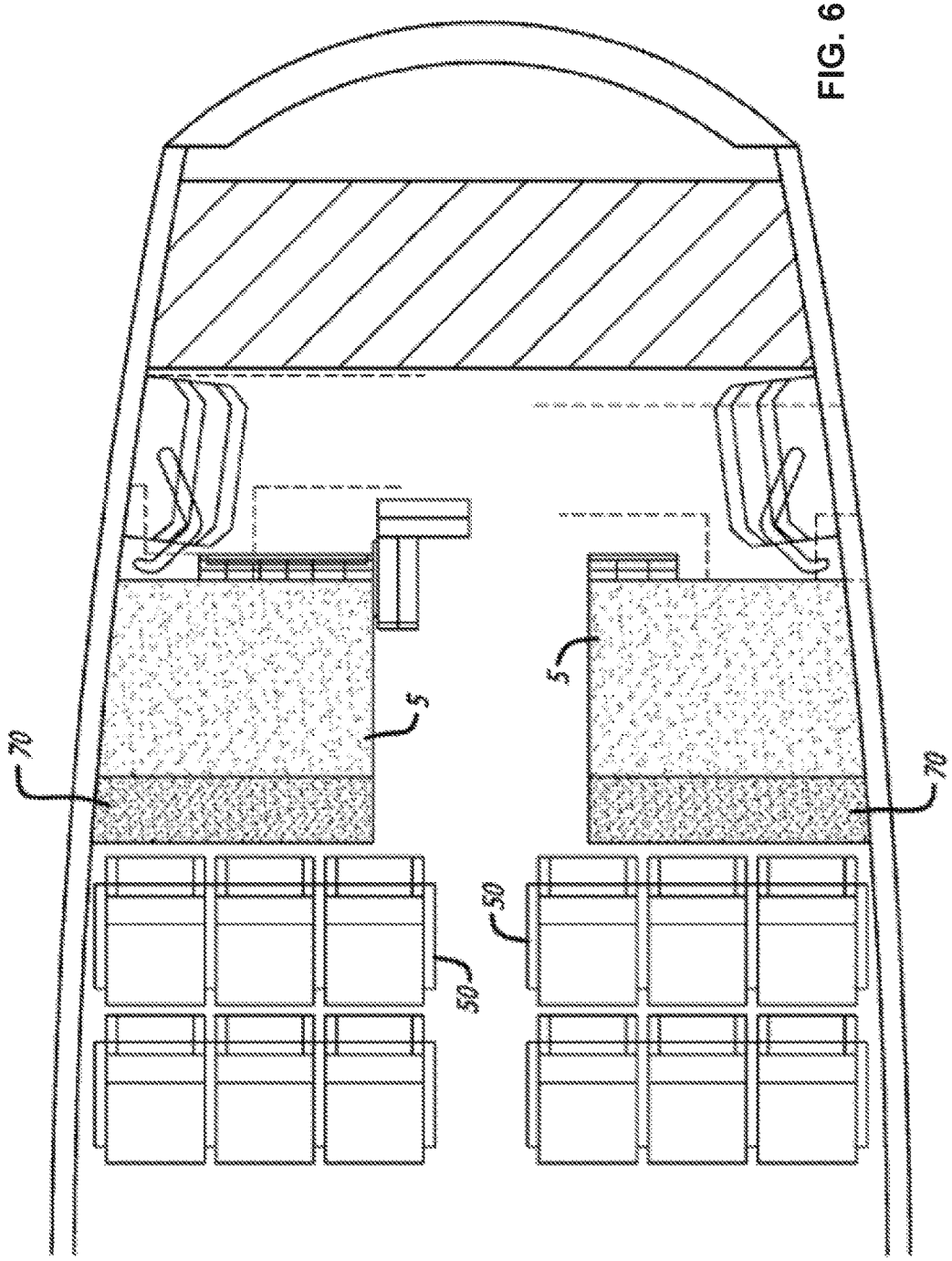
FIG. 6 is a plan view of the single aisle aircraft with an example modular lavatory system installation including a flex wall.

FIG. 6 illustrates a plan view of an aircraft with the flex wall module 70 of the modular lavatory system 5 installed. The flex wall module 70 may be removable and conformable to a variety of situations and needs of the customer. The layout of the plan view illustrates the design reduction in the modular lavatory system 5 with the flex wall module 70 as compared with FIG. 1, while providing a customizable section to gain extra cabin space for carriers to utilize for additional revenue streams, e.g., additional row of seats 50 or ancillary design solutions.

Figure 7:
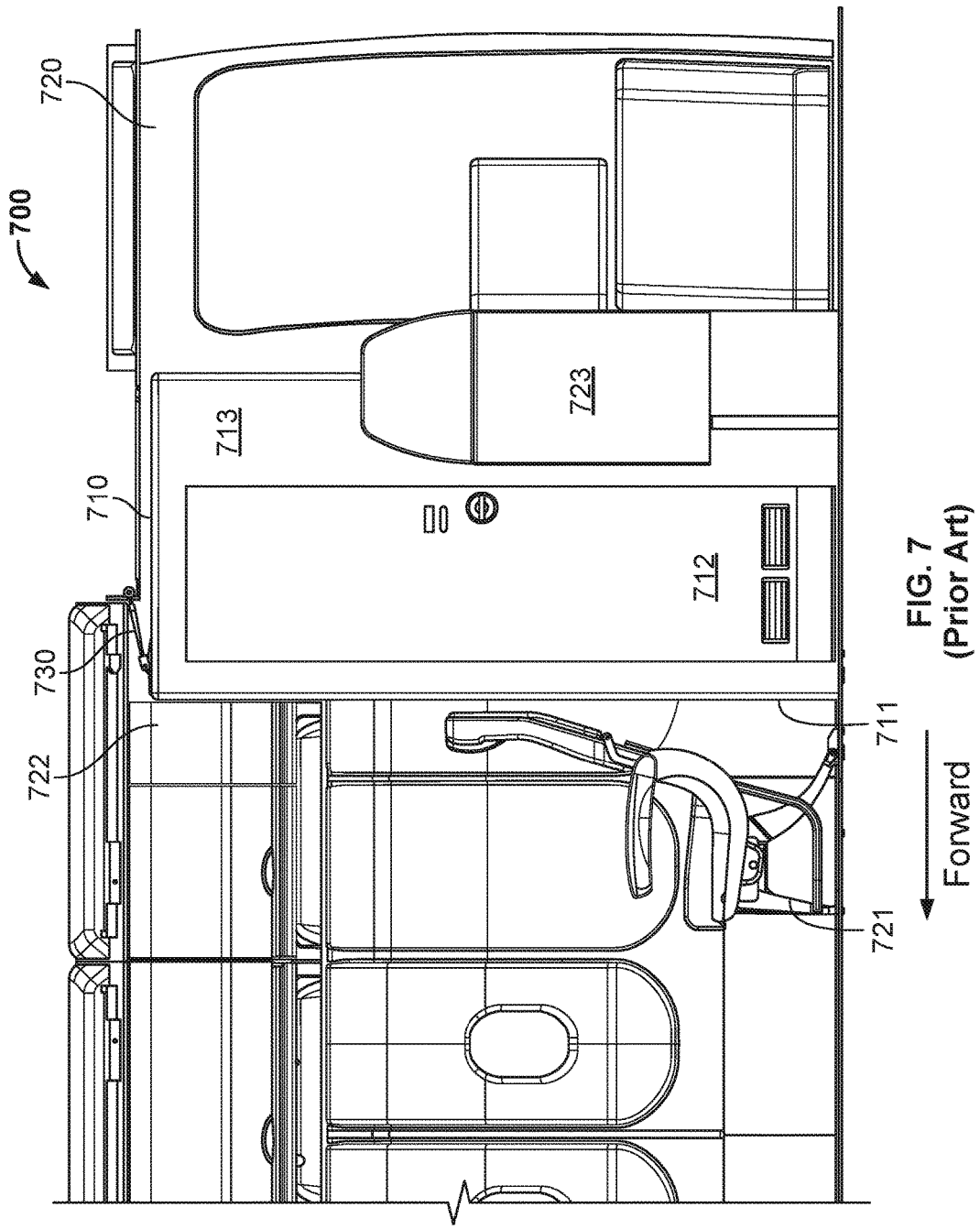
FIG. 7 shows a right hand side view of an existing, prior art aft cabin and lavatory arrangement in an aircraft.

FIG. 7 shows a right hand side view of an existing, prior art aft cabin and lavatory arrangement 700 in an aircraft, such as an Airbus A319, A420 or A321 aircraft. As shown, a standard conventional original equipment manufacturer (OEM) lavatory 710 is installed in a cabin 720. The conventional lavatory 710 is fixed to the structure of the aircraft through some support provisions (also referred to as preexisting lavatory monument anchors), such as an overhead support provision 730. A forward sidewall termination line 711 of the conventional lavatory 710 is adjacent to a standard OEM bin 722 and close to backs of a row of passenger seats 721. In addition, an aisle mounted pivot attendant seat 723 is installed besides a front wall 713 of the conventional lavatory 710 and to the right of a door 712 of the conventional lavatory 710.

Figure 8:
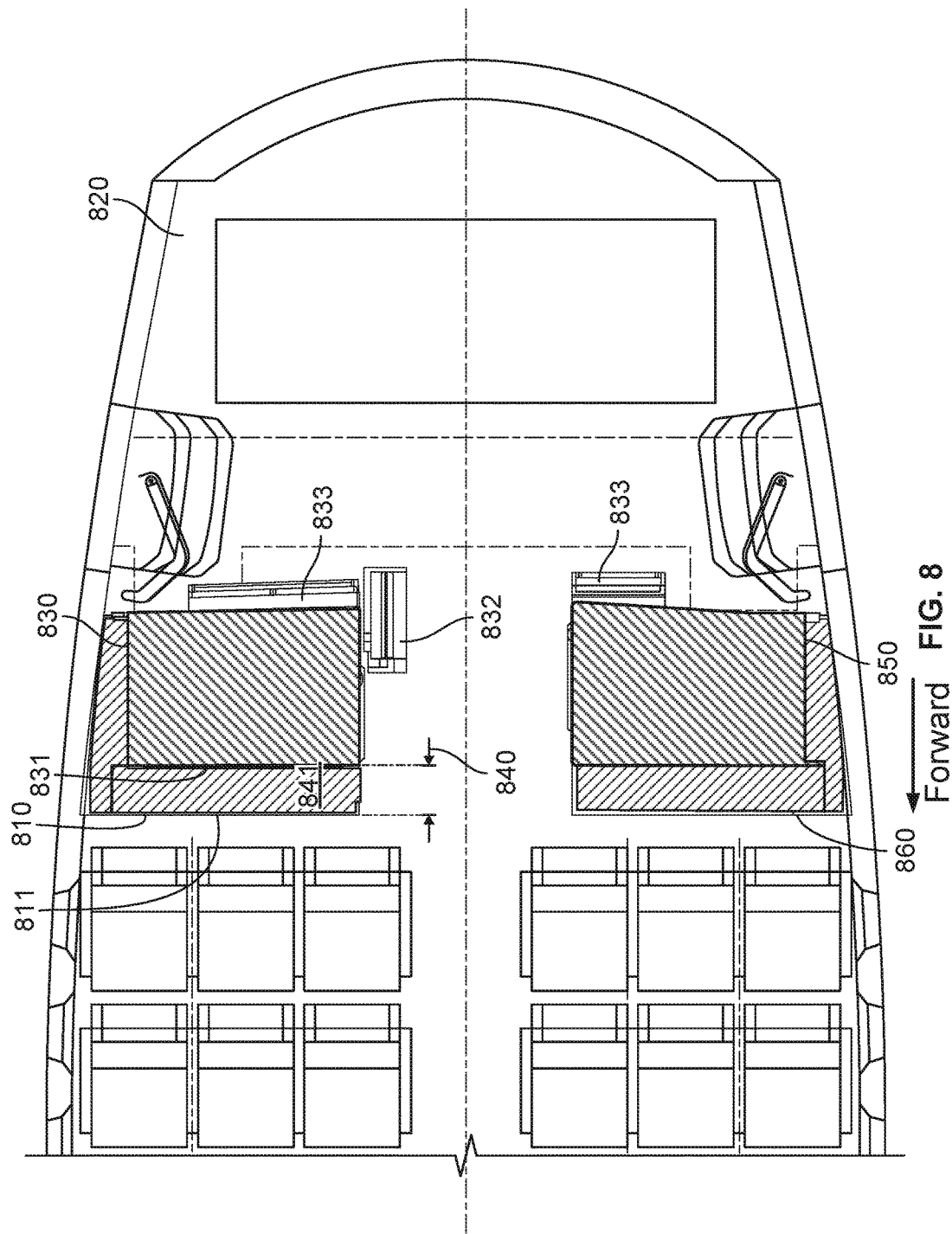
FIG. 8 shows a plan view of an aft portion of an aircraft cabin where an example modular lavatory system replaces a conventional lavatory to retrofit an existing aircraft cabin.

FIG. 8 shows a plan view of an aft portion of an aircraft cabin 820 where a modular lavatory system having a footprint 830 replaces a conventional lavatory having a footprint 810 to retrofit an existing aircraft cabin. As shown, the footprint 830 of the modular lavatory system overlays the footprint 810 of the conventional lavatory. The modular lavatory system footprint 830 is narrower than the conventional lavatory footprint 810 along the longitudinal direction of the aircraft cabin 820. Specifically, in FIG. 8, the forward border 831 of the modular lavatory system footprint 830 is a distance 840 away from the forward border 811 of the conventional lavatory footprint 810 while the rearward borders of both the modular and conventional lavatory footprints 830/810 align with each other. An extra cabin space 841 is thus created. In one example, the distance 840 has a length of nine inches.

It is noted that the modular lavatory system having the footprint 830 can be positioned at any suitable positions within the footprint 810 of the conventional lavatory according to requirements of customers. For example, in addition to the installation position shown in FIG. 8, the modular lavatory system having the footprint 830 can be disposed in a position that the footprint 830 is aligned with the forward border 811 of the conventional lavatory, creating an extra cabin space besides the right side of the modular lavatory system. Accordingly, configuration of the modular lavatory system (e.g., what types of replaceable modules are adopted) can be adapted depending on the location of the modular lavatory system.

In FIG. 8, an existing aisle mounted pivot attendant seat 832 is relocated to a position such that the attendant seat 832 does not block the entrance to the lavatory base module of the modular lavatory system. In addition, attendant seats 833 are mounted on the aft wall of the modular lavatory system. Similarly, another modular lavatory system footprint 850 overlaying a conventional lavatory system 860 is also shown across from the modular lavatory system footprint 830, description of which is omitted for brevity.

Figure 9:
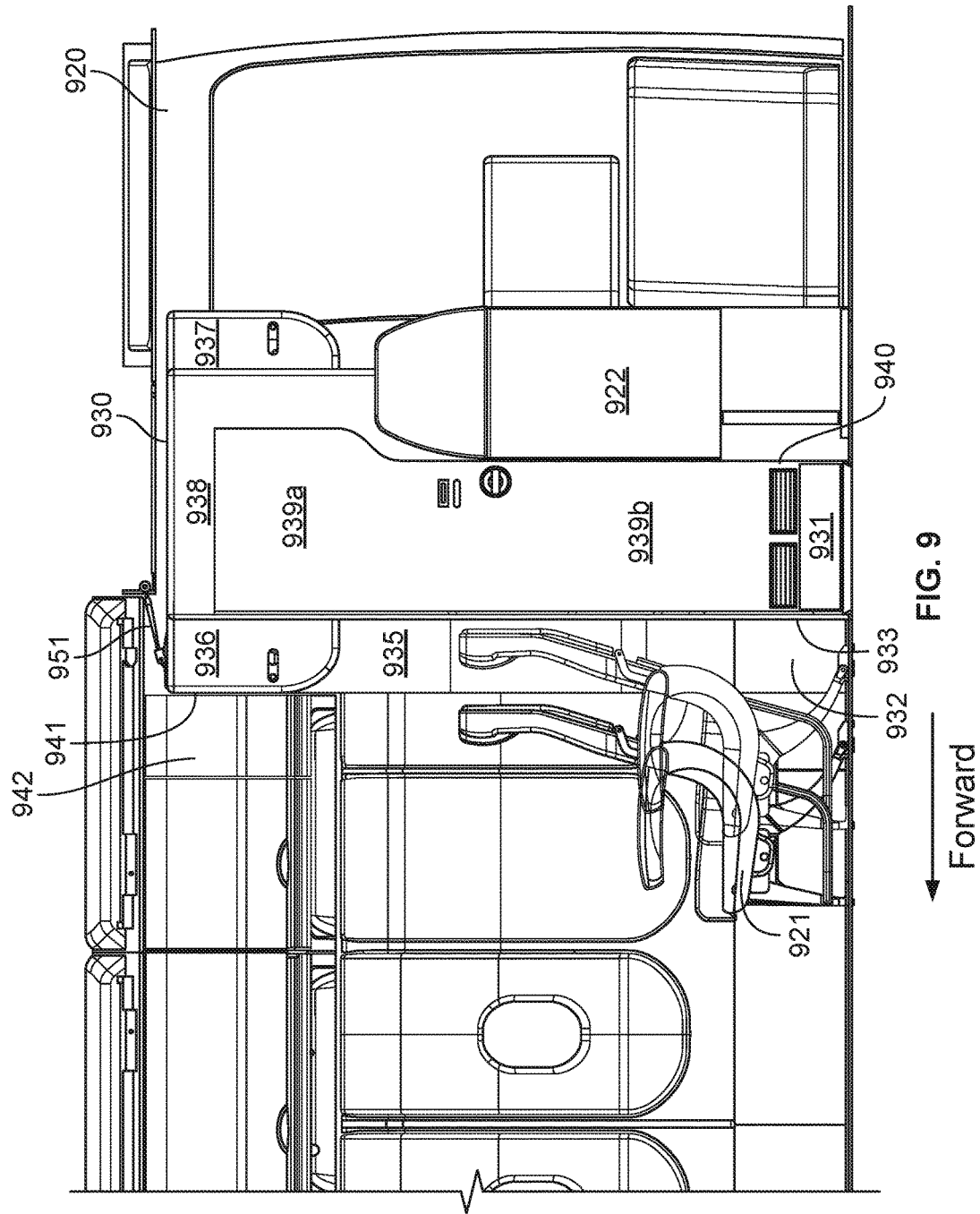
FIG. 9 shows a right hand side view of an aircraft cabin according to an embodiment of the disclosure where an example modular lavatory system is retrofitted into the cabin replacing a conventional lavatory.

FIG. 9 shows a right hand side view of an aircraft cabin 920 according to an embodiment of the disclosure. A modular lavatory system 930 is retrofitted into the cabin 930 replacing a conventional lavatory. The modular lavatory system 930 includes a base lavatory module 938 that has a base 931 aligned with an aft border of a footprint of the conventional lavatory. The base 931 has a footprint smaller than that of the conventional lavatory, thus an extra space 932 is created besides the forward sidewall 933 of the modular lavatory system 930. In one example, a row of passenger seats 921 can be moved rearward nine inches into the extra space 932.

The modular lavatory system 930, in some implementations, includes a sidewall filler panel 935. The sidewall filler panel 935 is positioned besides the forward sidewall 933 of the modular lavatory system 930 and covers an inner surface of the cabin 920 originally covered by the conventional lavatory. The modular lavatory system 930 may further include a first upper stowage region 936 and a second upper stowage region 937 disposed against the forward and aft sidewalls of the modular lavatory system 930, respectively. One of the upper stowage regions 936, 937, for example, is integrated with the lavatory base module 938, while the other upper storage region 936, 937 is used for a detachable stowage module. As shown, the forward side 941 of the upper stowage region 936 is adjacent to a rearward side 942 of an existing standard OEM overhead bin 942, and occupies an upper portion of the extra space 932.

The modular lavatory system 930, in some embodiments, is designed for fixation to the structure of the cabin 920 by using an overhead support provision 951 used by the conventional lavatory. In addition, an aisle mounted pivot attendant seat 922, previously mounted to the conventional lavatory, may be installed at a relocated position such that the forward side of the attendant seat 922 is aligned with the aft edge of a door of the modular lavatory system 930.

The base lavatory module 938 includes a door 940 in an aisle wall of the base lavatory module 938. In some implementations, the door 940 includes a wider upper portion 939a and a narrower lower portion 939b, such that a profile of the door 938 at the side approximate the aisle attendant seat 922 conforms to the profile of the aisle attendant seat 922. In this way, a user of the modular lavatory system 930 can have a wider space at the upper portion 939a of the door 940 when entering or exiting the modular lavatory system 930 while enough space in front of the aisle door can be provided for installation of the aisle attendant seat 922.

Figure 10:
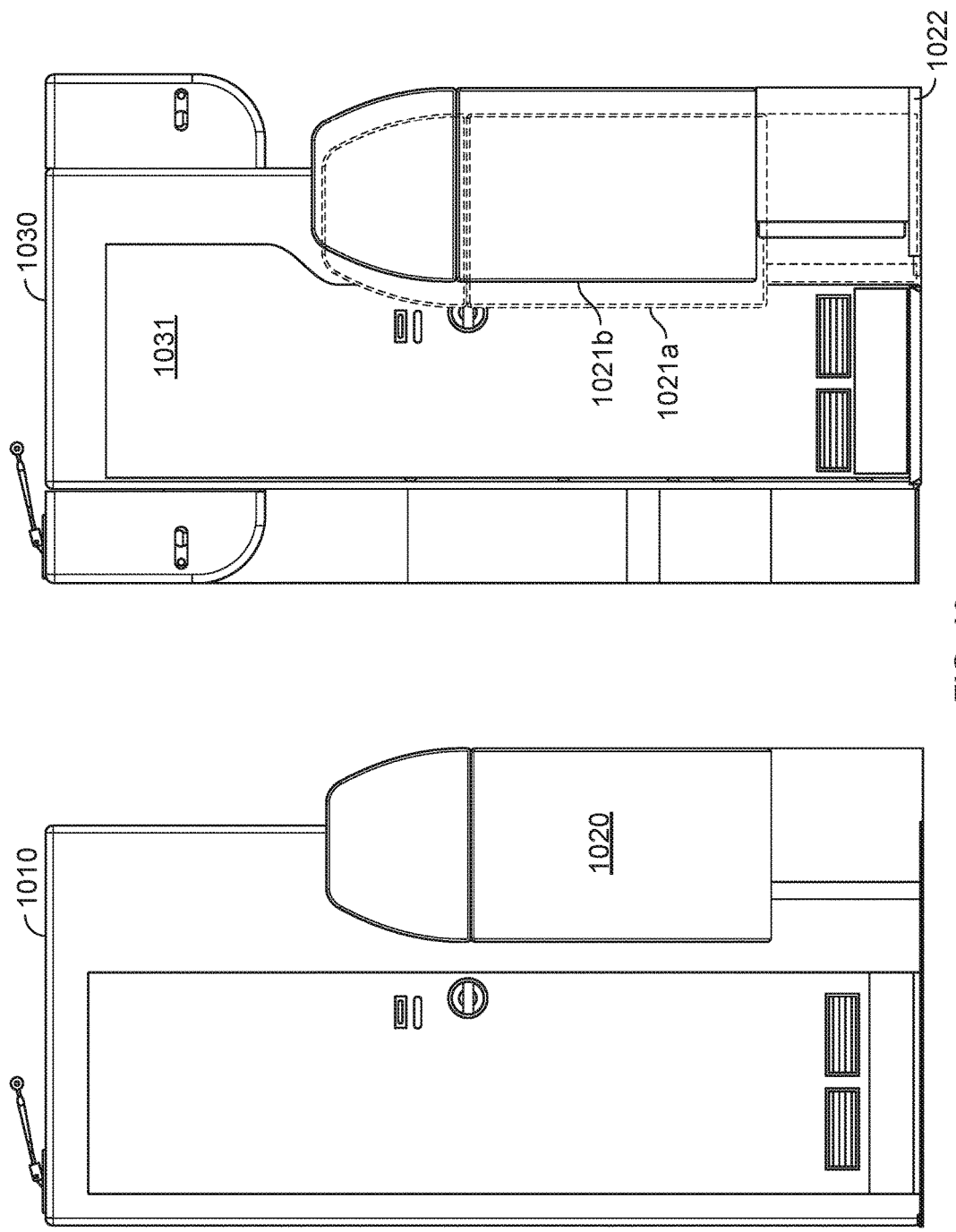
FIG. 10 illustrates how an existing aisle mounted pivot attendant seat may be relocated to adapt to an installation of an example modular lavatory system in an aircraft cabin.

FIG. 10 illustrates how an existing aisle mounted pivot attendant seat 1020 may be relocated to adapt to an installation of a modular lavatory system 1030 in an aircraft cabin. A conventional lavatory 1010 is shown at the left side of FIG. 10 with the attendant seat 1020 installed besides the conventional lavatory 1010. A modular lavatory system 1030 is shown at the right side of FIG. 10 which is retrofit into a space occupied originally by the conventional lavatory 1010. As shown at the right side of FIG. 10, after the installation of the modular lavatory system 1030, the attendant seat 1020 is relocated from position 1021a (indicated by the dashed line) to position 1021b to yield a space for entering a door 1031 of the modular lavatory system 1030. In one example, a seat pallet 1022 of the attendant seat 1020 is fixed to the structure of the aircraft cabin using an existing standard interface attach provision. In another example, the seat pallet 1022 of the attendant seat 1020 is fixed to the aisle wall of the base lavatory module of the modular lavatory system 1030.

Figure 11:
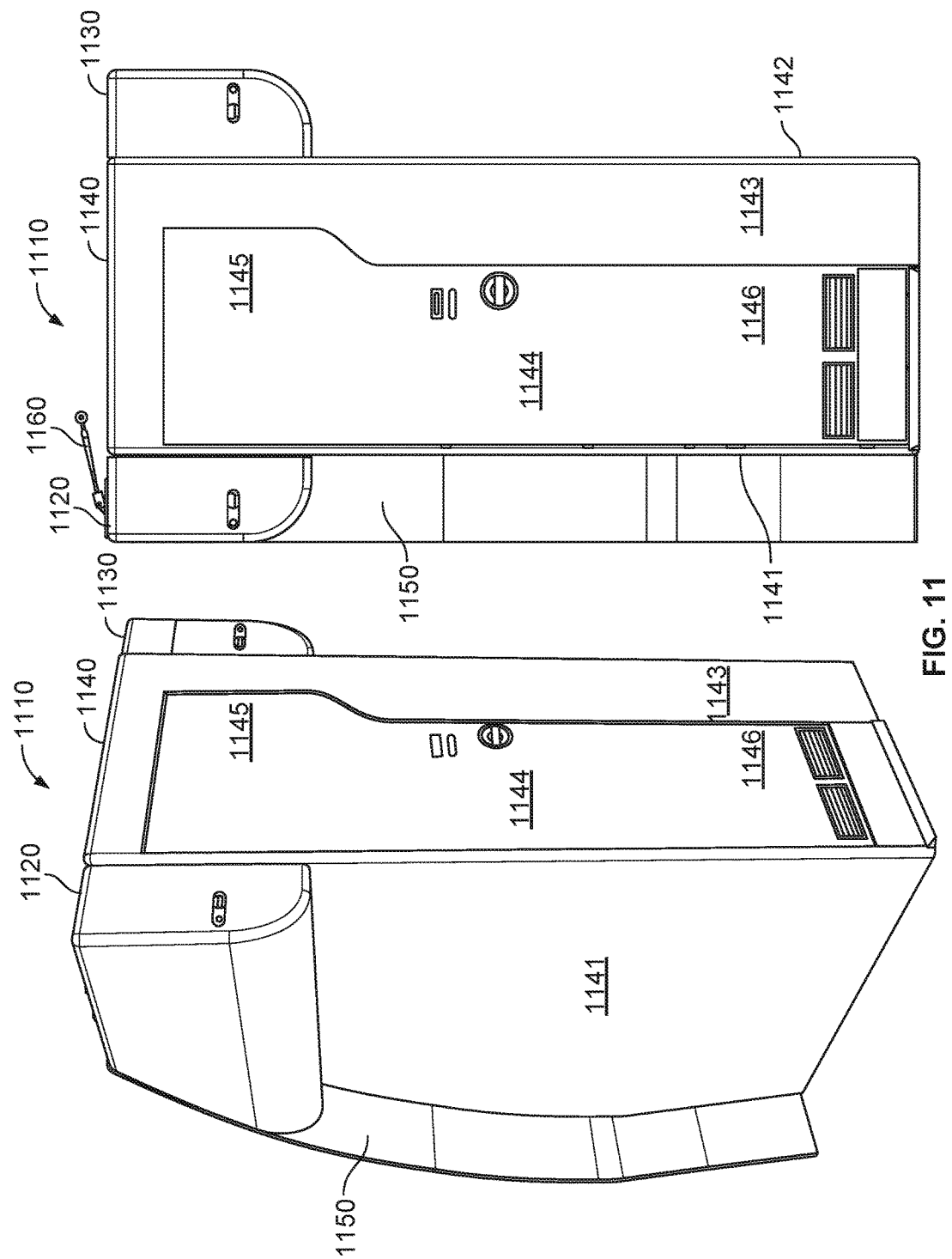
FIG. 11 shows an example modular lavatory system with a baseline configuration according to an embodiment of the disclosure.

FIG. 11 shows a modular lavatory system 1110 with a baseline configuration according to an embodiment of the disclosure. Specifically, the left side of FIG. 11 shows a perspective view of the modular lavatory system 1110 and the right side of FIG. 11 shows a front view of the modular lavatory system 1110. As shown, the modular lavatory system 1110 includes a base lavatory module 1140, an upper stowage module 1120 disposed against an upper portion of a first sidewall 1141 of the base lavatory module 1140, and an upper stowage area 1130 integrated with the base lavatory module 1130 at a second sidewall 1142 of the base lavatory module 1140. The sidewalls 1141/1142 and a front wall (aisle wall) 1143 form a housing enclosing a toilet unit (not shown). In one example, the integrated stowage area 1130 is used as a lavatory amenities compartment for storing lavatory supplies or equipment (e.g., driers, vending machines, and the like) accessible inside the base lavatory module 1140.

The modular lavatory system 1110, in some implementations, further includes a sidewall filler panel 1150 for covering an inner surface of a cabin which is originally covered by a conventional lavatory. In this way, no additional lining is needed after installation of the modular lavatory system 1110 in the space original occupied by the conventional lavatory. In various embodiments, the sidewall filler panel 1150 can be disposed at either side of the modular lavatory system 1110 depending on the installation position of the modular lavatory system 1110 in the footprint of the conventional lavatory. Alternatively, two sidewall filler panels may be installed at both sides of the modular lavatory system 1110. In addition, the modular lavatory system 1110 can be fixed with the existing overhead supporting provision 1160 (preexisting lavatory monument anchor) in some examples.

The base lavatory module 1140 includes a door 1144 in the aisle wall 1143. In some implementations, the door 1144 has a wider upper portion 1145 and a narrower lower portion 1146.

Figure 12C:
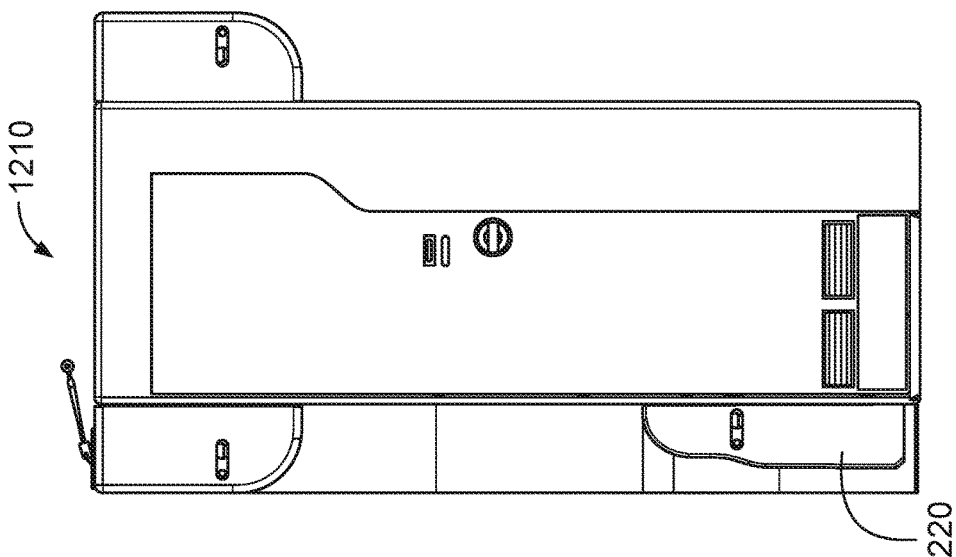
FIGS. 12B and 12C shows a perspective view and a front view of an example modular lavatory system, respectively, according to an embodiment.
Figure 12B:
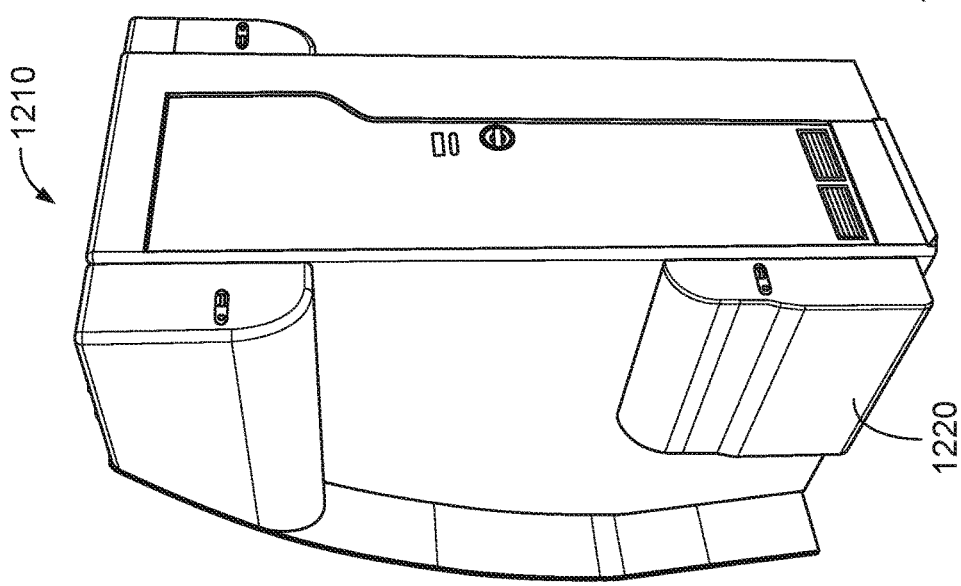
Figure 12A:
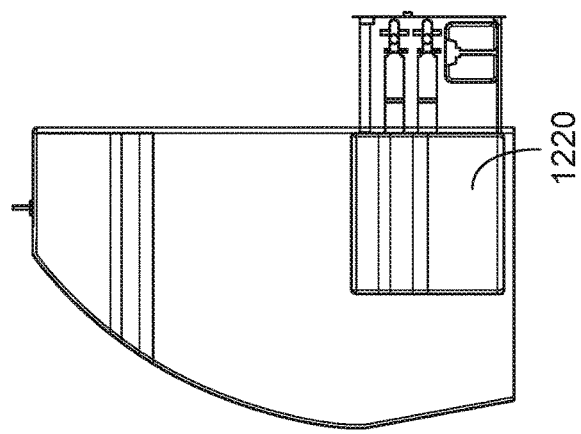
FIG. 12A shows a left side view of an example modular lavatory system with a wall mounted floor stowage module at an opened status.

FIGS. 12B and 12C shows a perspective view and a front view of a modular lavatory system 1210, respectively, according to an embodiment. The modular lavatory system 1210 is similar to the modular lavatory system 1110 with a baseline configuration. However, the modular lavatory system 1210 further includes a "plug and play" wall mounted floor stowage module 1220 disposed within the extra space besides a sidewall of the modular lavatory system 1210. In one implementation, the wall mounted floor stowage module 1220 is used to store emergency and miscellaneous equipment. FIG. 12A shows a left side view of the modular lavatory system 1210 with the wall mounted floor stowage module 1220 at an opened status. In other implementations, the wall mounted floor stowage module 1220 can be used for other various purposes with various configurations. For example, the stowage module 1220 can be a cabinet with shelves or a door, or a bin operated to a fully or partially opened position, for containing supplies or equipment for passengers or attendants.

Figure 13:
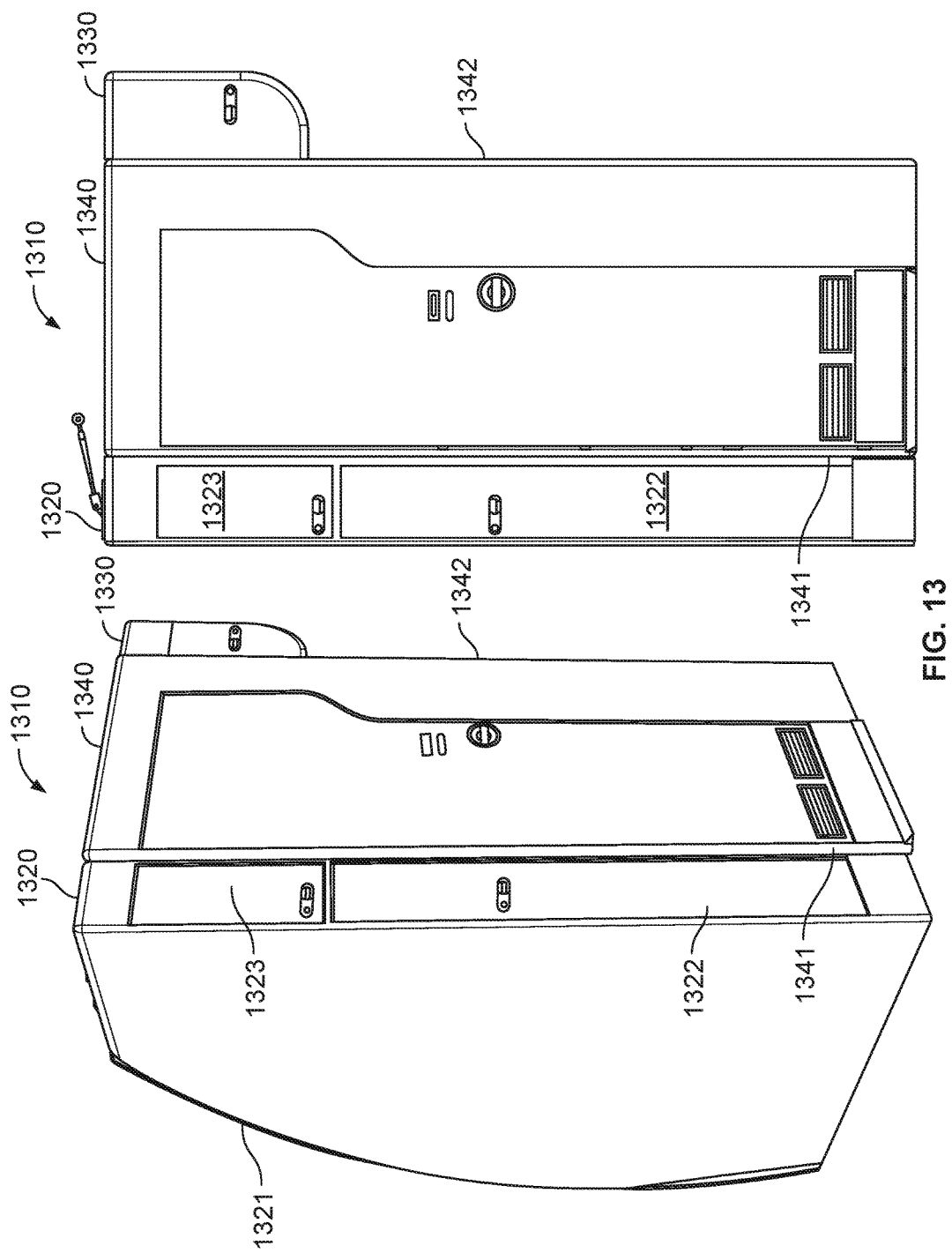
FIG. 13 shows an example modular lavatory system with a wall stowage module according to an embodiment.

FIG. 13 shows a modular lavatory system 1310 with a perspective view at the left side and a front view at the right side according to an embodiment. The modular lavatory system 1310 has a configuration different from the modular lavatories in FIG. 11 or FIGS. 12B and 12C. As shown, the modular lavatory system 1310 includes a base lavatory module 1340 and an integrated upper stowage area 1330 at a first sidewall 1342 of the modular lavatory system 1310, which is similar to the configuration of the modular lavatory system 1210 in FIGS. 12B and 12C. However, a "plug and play" flex wall module 1320 is disposed against a second sidewall 1341 of the modular lavatory system 1340. The flex wall module 1320 occupies the extra space created besides the second sidewall 1341 of the modular lavatory system 1340. Specifically, in one example, the footprints of the flex wall module 1320 and the base lavatory module 1340 together fill the footprint of a conventional lavatory replaced by the modular lavatory system 1310. In one example, the flex wall module 1320 has a same height as the base lavatory module 1340, and the rear side 1321 of the flex wall module 1320 conforms with the inner profile of the cabin for installing the modular lavatory system 1310. In various implementations, the flex wall module 1320 can be configured with various structures to serve various purposes. In the example modular lavatory system of FIG. 13, the flex wall module 1320 is configured to include an add-on coat closet 1322 and a miscellaneous stowage cabin 1323. In another example, the flex wall module 1320 may include cabinets with shelves and lockable doors, for example to store emergency equipment, cleaning equipment, and/or other supplies. In a further example, the flex wall module 1320 may include storage regions open to the cabin, for example including shelves and/or bins for storing magazines, blankets, emergency equipment, passenger or attendant's personal belongings, and the like.

Although illustrated as a single flex wall module 1320, in some embodiments, the flex wall module 1320 may include two or more sub-modules configured for individual installation. For example, the customer may be provided the option to purchase a locked or open shelving (and/or bins) upper storage sub-module, a locked or open shelving (and/or bins) lower storage sub-module, a locked or open coat closet lower storage sub-module, etc. In another example, a side-facing lower sub-module may include convenience provisions for passengers seated aft of the modular lavatory system, such as personal item storage and/or entertainment (media) provisions.

Figure 14:
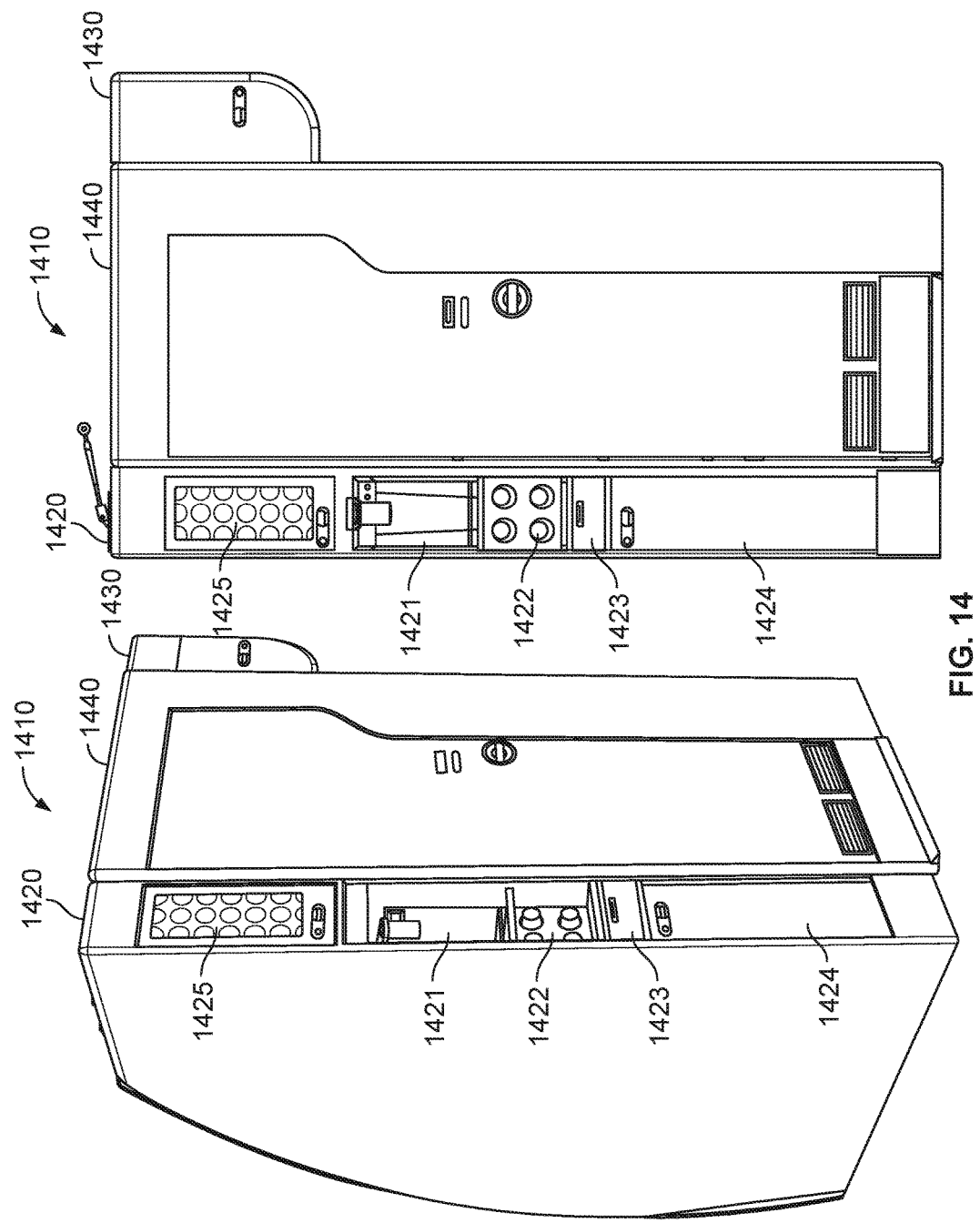
FIG. 14 shows another example modular lavatory system with a wall stowage module according to an embodiment of the disclosure.

FIG. 14 shows another modular lavatory system 1410 with a flex wall module 1420 according to an embodiment of the disclosure. A perspective view and a front view of the modular lavatory system 1410 are shown on the right side and left side of FIG. 14, respectively. The modular lavatory system 1410 includes a base lavatory module 1440 and an upper stowage module 1430. The flex wall module 1420 is configured to be a beverage kiosk. Specifically, in one example, the beverage kiosk includes a beverage brewing system 1421, a cup holder 1422, a pull-out table 1423, and one or more stowage compartments 1424 and 1425. The brewing system 1421 can be a pay-for-pod brewer supplying teas, coffees, and the like, generating revenues for operators. In some embodiments, the flex wall module 1420 includes an electrical connection for supplying electricity to the brewing system 1421. For example, the flex wall module 1420 may include one or more A/C outlets for connecting the brewing system 1421. The electricity, in another example, may provide a connection for a lighting system for illuminating the beverage region. For example, overhead lighting may be provided in the beverage kiosk region. In further embodiments, the flex wall module 1420 includes a plumbing connection for supplying potable water to the brewing system 1421. The potable water supply, for example, may be branched from a water supply directed to a sink of the base lavatory module.

Figure 15:
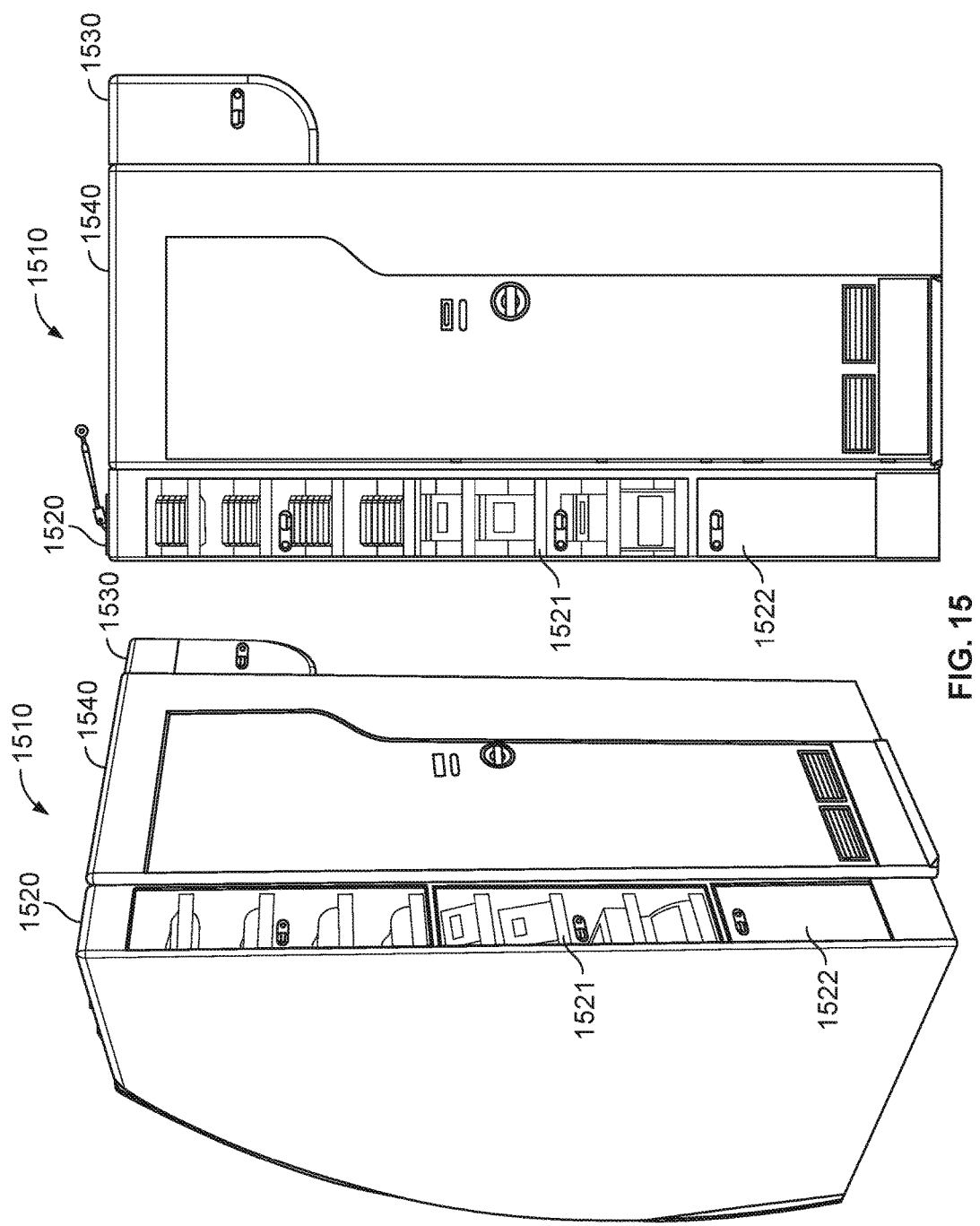
FIG. 15 shows a further example modular lavatory system with a wall stowage module according to an embodiment of the disclosure.

FIG. 15 shows a further modular lavatory system 1510 with a flex wall module 1520 according to an embodiment of the disclosure. Similarly, a perspective view and a front view of the modular lavatory system 1510 are shown on the right side and left side of FIG. 15, respectively, and the modular lavatory system 1510 includes a base lavatory module 1540 and an upper stowage module 1530. However, the flex wall module 1520 is configured to be a snack and beverage kiosk. Specifically, in one example, the snack beverage kiosk includes two sections 1521/1522. The first section 1521 provides space for storing various snacks and beverages. The second section 1522 is configured to be a stowage compartment. In various implementations, the flex wall module 1520 can include a paid snack/beverage dispenser, a free snack/beverage dispenser, an ice maker, a refrigerator, and the like. To provide elements such as a refrigerator and/or an ice maker, in some embodiments, the flex wall module 1520 may include a coolant connection system for receiving a coolant supply. The coolant supply, for example, may be provided by a galley monument. In some embodiments, the flex wall module 1520 includes electrical connections, for example to supply an A/C outlet with electricity to supply a connection for a refrigerator unit or chilled snack/beverage dispenser. The electricity, in another example, may provide a connection for a lighting system for illuminating the snack/beverage region.

It is to be understood that the above described various modules, such as the attendant seat module, the upper stowage module, the floor stowage module, and the flex wall module, are designed to be "plug and play" components of a modular lavatory system, which provides the flexibility for configuring and installing a modular lavatory system according to varied customers' needs. In addition, the various modules can be positioned to either side of a modular lavatory system depending on requirements of a customer. Further, the various exchangeable modules can be sold with the base lavatory module to a customer for replacing a conventional lavatory system or they can be sold separately for updating or modifying a configuration of a modular lavatory system when customer needs change later.

Figure 16:
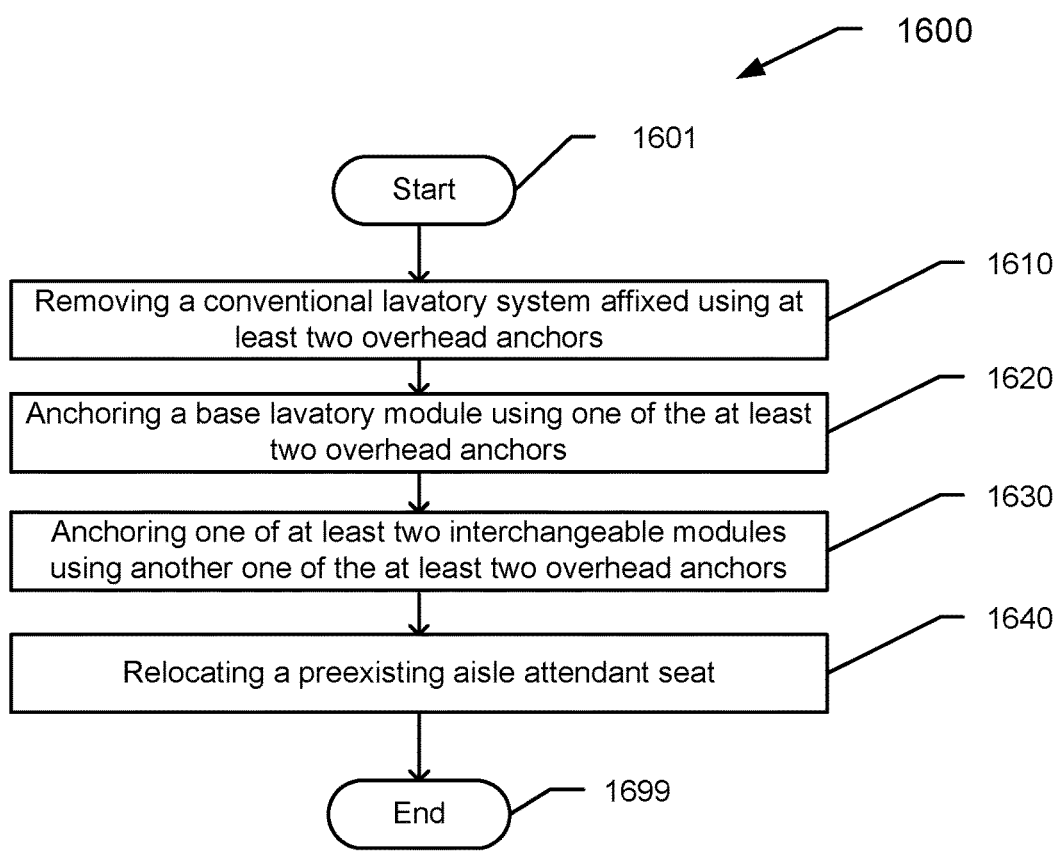
FIG. 16 shows a process for retrofitting a conventional lavatory monument location with a modular lavatory system in an aircraft cabin in one example.

FIG. 16 shows an example process 1600 for retrofitting a conventional lavatory monument location with a modular lavatory system described herein in an aircraft cabin. The process starts from 1601, and proceeds to 1610.

At 1610, in some implementations, a conventional lavatory monument is removed from the aircraft cabin. The conventional lavatory system, for example, was fixed to the aircraft cabin using at least two overhead anchors. The conventional lavatory system had a footprint of X length and Y width.

At 1620, in some implementations, a base lavatory module of the modular lavatory system is fixed to the structure of the aircraft cabin at the conventional lavatory monument location using one of the at least two overhead anchors. The base lavatory module, for example, has a width less than Y width and a length of approximately X length. The width, in some embodiments, may refer to a greatest width of the base lavatory module (e.g., including a widening region of the base lavatory module). In other embodiments, the width of the base lavatory module refers to a floor footprint width of the base lavatory module.

At 1630, in some implementations, a selected module of two or more interchangeable modules of the modular lavatory system is fixed to the structure of the aircraft cabin using another one of the at least two overhead anchors. The selected module, for example, has a width of substantially Y width minus the width of the base lavatory module, such that the width of the base lavatory module plus the width of the selected module substantially fills the footprint of the conventional lavatory monument. The width, in some embodiments, may refer to a greatest width of the selected module (e.g., being an upper width in the circumstance of an upper stowage module which does not reach the floor of the cabin). In other embodiments, the width of the selected module refers to a floor footprint width of the selected module (e.g., a flex wall module).

At 1640, in some implementations, a preexisting aisle attendant seat is relocated to a location approximate the aisle wall of the base lavatory module of the modular lavatory system such that the preexisting aisle attendant seat does not block a door in aisle wall of the base lavatory module. FIG. 10 illustrates an example of such a relocation. In one example, a seat pallet of the attendant seat is fixed to the structure of the aircraft cabin using a preexisting standard interface attachment provision.

Although the process 1600 is illustrated as a series of steps, in other implementations, the process 1600 may be performed in a different order. For example, the selected module may be anchored in the cabin (1630), in some implementations, prior to anchoring of the base lavatory module (1620). In further implementations, the process 1600 may include more or fewer steps. For example, in some implementations, there may be no preexisting aisle attendant seat to relocate (1640). Further modifications are possible while remaining in the scope and intent of the process 1600.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A modular lavatory system for replacing an existing lavatory monument in an aircraft cabin, comprising:
 a base lavatory module comprising a fore sidewall, an aft sidewall, and an aisle wall that form a housing enclosing a toilet unit, wherein a first sidewall of the fore sidewall and the aft sidewall includes a widening region positioned above a passenger seat headrest height; and
 at least two interchangeable modules configured for mounting against another sidewall of the fore sidewall and the aft sidewall;
 wherein a footprint of the base lavatory module is smaller than a footprint of the existing lavatory monument, such that an extra cabin space is created proximate the other sidewall of the base lavatory module, wherein the at least two interchangeable modules are each dimensioned for installation within the extra cabin space.

2. The modular lavatory system of claim 1, wherein one of the at least two interchangeable modules is an upper stowage module configured to abut an upper portion of the other sidewall of the base lavatory module.

3. The modular lavatory system of claim 2, wherein the upper stowage module is configured for installation between the other sidewall and a side panel of an overhead storage bin in the aircraft cabin.

4. The modular lavatory system of claim 1, wherein one of the at least two interchangeable modules is a floor stowage module configured to abut the other sidewall of the base lavatory module.

5. The modular lavatory system of claim 1, wherein one of the at least two interchangeable modules is an attendant seat module configured to abut the other sidewall of the base lavatory module.

6. The modular lavatory system of claim 1, wherein one of the at least two interchangeable modules is a flex wall module configured to abut the other sidewall of the base lavatory module.

7. The modular lavatory system of claim 6, wherein the flex wall module includes at least one of a beverage and a snack kiosk.

8. The modular lavatory system of claim 6, wherein the flex wall module includes a stowage cabin.

9. The modular lavatory system of claim 1, further comprising a sidewall filler panel for covering an inner surface of the aircraft cabin beneath the widening region, wherein the inner surface was originally covered by the existing lavatory monument.

10. The modular lavatory system of claim 9, wherein the sidewall filler panel is integrated into the first sidewall of the base lavatory module.

11. The modular lavatory system of claim 9, further comprising a second sidewall filler panel for covering an inner surface of the aircraft cabin adjacent to the other sidewall of the base lavatory module.

12. The modular lavatory system of claim 1, wherein the modular lavatory system is fixable to a structure of the aircraft cabin using at least two upper monument anchors provided for fixing the existing lavatory monument, wherein the base lavatory module is fixable using a first upper monument anchor of the at least two upper monument anchors, and a selected interchangeable module of the at least two interchangeable modules is fixable using a second upper monument anchor of the at least two upper monument anchors.

13. The modular lavatory system of claim 1, wherein the base lavatory module further comprising a door in the aisle wall of the base lavatory module, the door including a wider upper portion and a narrower lower portion to form a profile conforming to a profile of an aisle attendant seat mounted to the aisle wall proximate the door.

14. A method for replacing a conventional lavatory monument with a modular lavatory system in an aircraft cabin, the method comprising:

positioning a base lavatory module in a region of the aircraft cabin previously used by the conventional lavatory monument, wherein
the conventional lavatory monument utilized a footprint having a width X,
and
positioning the base lavatory module comprises positioning a lower edge of a first side panel of the base lavatory module of the modular lavatory system near a first end of the width X of the footprint, wherein
the base lavatory module has a lower width less than X and an upper width greater than the lower width, wherein the first side panel comprises a widening region disposed above a passenger seat headrest height and extending to an upper edge of the first side panel;
anchoring the base lavatory module to an upper structure of the aircraft cabin using one of the at least two overhead anchors;
positioning an inner side panel of a selected interchangeable module of at least two interchangeable modules proximate the other side panel of the base lavatory module;
and
anchoring the selected interchangeable module to the upper structure of the aircraft cabin using another one of the at least two overhead anchors.

15. The method of claim 14, further comprising:
relocating a preexisting aisle attendant seat to a location proximate an aisle panel of the base lavatory module such that the preexisting aisle attendant seat does not block a door in the aisle panel of the base lavatory module.

16. The method of claim 15, wherein a seat pallet of the attendant seat is fixed to structure of the aircraft cabin using a preexisting standard interface attachment provision.

17. The method of claim 14, wherein positioning the lower edge of the first side panel near the first end of the width X comprising positioning the lower edge of the first side panel such that a sidewall filler panel covers an inner surface of the aircraft cabin beneath the widening region originally covered by the conventional lavatory monument.

18. The method of claim 17, wherein the sidewall filler panel is integrated into the first side panel.

19. The method of claim 14, further comprising sealing the selected interchangeable module to the base lavatory module along abutting panels using a releasable seal.

20. The method of claim 14, further comprising releasably fixing the interchangeable module to the base lavatory module.

* * * * *